United States Patent [19]

Ikura et al.

[11] 4,284,469
[45] Aug. 18, 1981

[54] METHOD AND APPARATUS FOR CONCENTRATING A LIQUID

[75] Inventors: Michio Ikura, Toronto; Frederick W. S. Jones, Campbellville; Harley C. Prime, St. Lambert; Ian Rodger, Willowdale, all of Canada

[73] Assignee: Chemetics International, Vancouver, Canada

[21] Appl. No.: 120,556

[22] Filed: Feb. 11, 1980

[30] Foreign Application Priority Data

Jan. 15, 1980 [CA] Canada .................................. 343695

[51] Int. Cl.³ .......................................... B01D 1/00
[52] U.S. Cl. ......................... 159/28 R; 159/DIG. 1;
159/1 C; 159/16 R; 204/294; 219/284
[58] Field of Search ............ 159/28 R, DIG. 1, 16 R,
159/1 C; 204/284, 294, 59 F; 219/284, 288

[56] References Cited

U.S. PATENT DOCUMENTS

| | | | |
|---|---|---|---|
| 2,772,975 | 12/1956 | Rickers | 159/1 C |
| 3,181,593 | 5/1965 | Lindley | 159/1 C |
| 3,298,940 | 1/1967 | Ashley et al. | 204/59 |

*Primary Examiner*—Norman Yudkoff
*Attorney, Agent, or Firm*—Guy Drouin

[57] ABSTRACT

A corrosive liquid such as sulphuric acid is concentrated by boiling in an evaporator vessel having a thermosyphon loop connected to the bottom of the vessel. Electrodes of carbon which is essentially free of any organic binders are located in one leg of the thermosyphon loop to heat the liquid by current conducted through the liquid. The electrodes are located well below the liquid surface so that boiling occurs only above the electrode level, reducing erosion of the electrodes. The electrodes are blanketed with air which flows through the porous carbon into the liquid, thereby protecting the seals and electrode connections and also introducing air into the thermosyphon loop to promote circulation of the liquid in the loop.

4 Claims, 9 Drawing Figures

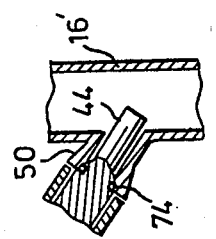
FIG. 7
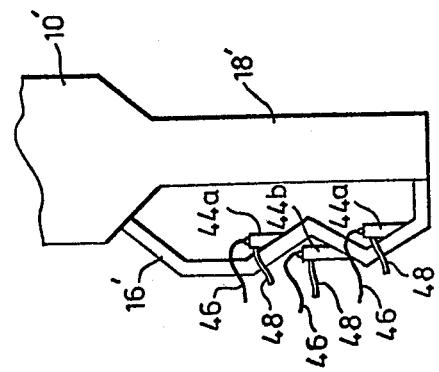
FIG. 9
FIG. 8
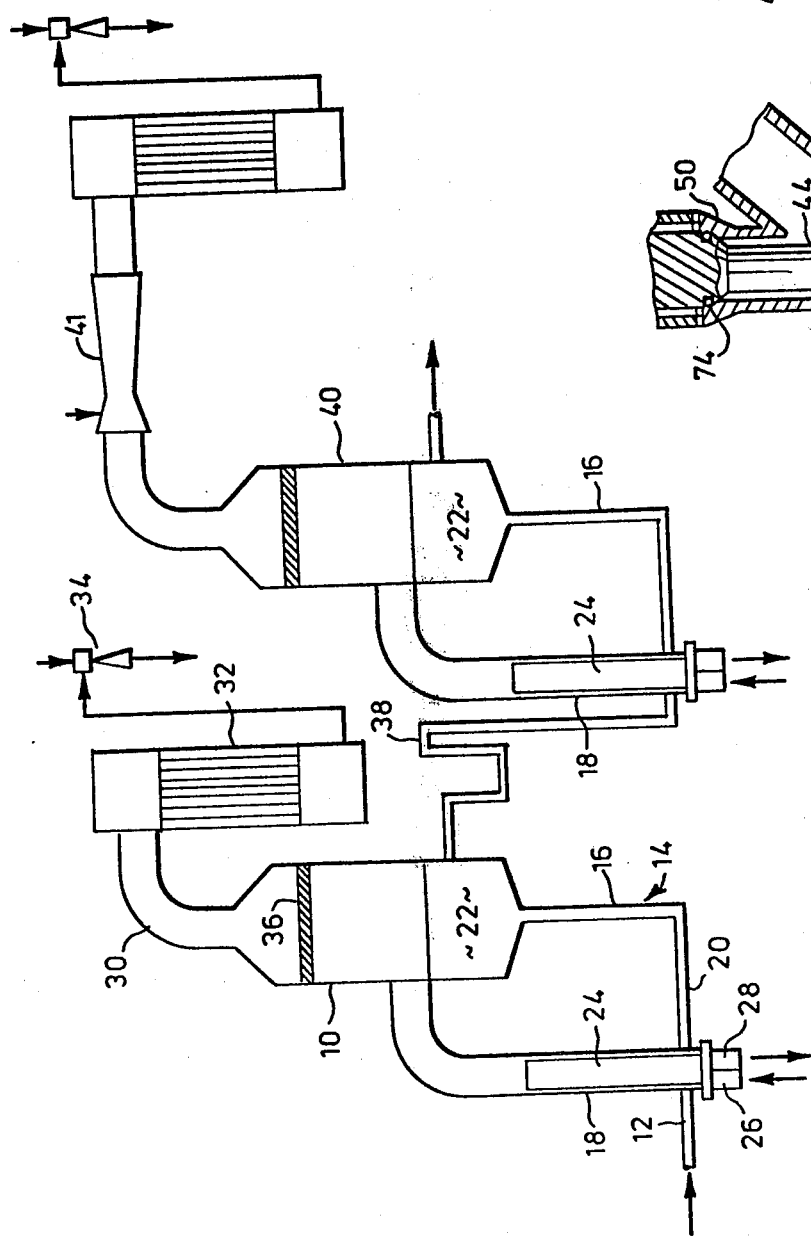
FIG. 1 (PRIOR ART)

METHOD AND APPARATUS FOR CONCENTRATING A LIQUID

This invention relates to apparatus for concentrating a corrosive electrically conducting acid, such as sulphuric acid or phosphoric acid.

Corrosive liquids such as sulphuric acid are normally concentrated by boiling water from them. The boiling is usually carried out by inserting a heating element, typically containing tantalum boiler tubes, inside the evaporator vessel used to boil the liquid. Unfortunately, liquids such as sulphuric acid are extremely corrosive at high temperatures. It is found that sulphuric acid at a temperature exceeding 190° C. will usually attack tantalum. Therefore acids such as sulphuric acid must be concentrated at a temperature such that the skin temperature of the tantalum tubes is less than 190° C., and this temperature limitation necessitates a substantial reduction of pressure in the evaporator. Because of the reduced pressure in the evaporator, a complex vacuum system must be used to condense the water boiled off the acid. The vacuum system usually includes a steam ejector to increase the pressure sufficiently to condense the water vapor. The steam ejector requires a great deal of steam, which is extremely energy inefficient. In addition, the capital costs of the vacuum system and of the heavy wall tantalum heater tubes required are high, particularly in plants used to produce higher concentration acid such as 96% sulphuric acid.

Accordingly, it is an object of the invention to provide apparatus for concentrating corrosive conducting acids using electrode boiling in a thermosyphon loop, so that the need for heater tubes is eliminated. In its broadest aspect the invention provides apparatus for concentrating an aqueous, corrosive, electrically conductive acid, comprising:

(a) an evaporator vessel adapted to contain said acid at a selected level,
(b) a thermosyphon loop connected to said evaporator vessel, said loop having first and second legs each having a top and bottom separated by a substantial vertical distance, the top of said first leg being connected to said vessel below said level, the top of said second leg being connected to said vessel approximately at or below said level, the bottom of said first leg being connected to the bottom of said second leg, said second leg having an orientation which has a substantial vertical component,
(c) a pair of spaced electrode structures located in said second leg and each electrode structure comprising:
  (i) a stub conduit extending from said second leg at an angle inclined to the horizontal,
  (ii) means defining with the end of said stub conduit remote from said second leg a gas-tight housing,
  (iii) an electrode of substantially inert material within said stub conduit, said electrode having a first portion extending into said second leg to contact said acid and a second portion in said housing, said electrode comprising a porous material communicating between the interior of said housing and said second leg,
  (iv) a seal encircling said electrode at a position spaced along said stub conduit from said second leg and seating against said stub conduit,
  (v) connection means within said housing connected to said second portion of said electrode and being separated by said seal from said first portion of said electrode, said connection means extending through said housing and being adapted to receive electric power from a power supply,
(d) said electrode structures being spaced substantially below said level,
(e) means for supplying electric power through said connection means to said electrodes at a rate such as to cause boiling of said acid entirely above said electrodes,
(f) means connected to said second leg for supplying a gas thereto at a pressure and flow sufficient to ensure circulation of said acid in said loop when said electric power is supplied to said electrodes and to stabilize said circulation,
(g) said means (f) being connected to each of said housings for pressurizing said housings to thereby force at least some of said gas through each electrode into said second leg whereby to protect said connection means against attack by said acid and to reduce acid attack against said seal.

Further objects and advantages of the invention will appear from the following description, taken together with the accompanying drawings, in which:

FIG. 1 is a diagrammatic view of a portion of a typical prior art sulphuric acid concentration system;

FIG. 7 is a cross-sectional view showing a form of electrode structure mounting;

FIG. 8 is a cross-sectional view showing another form of electrode mounting; and FIG. 9 is a diagrammatic view showing an alternative piping configuration which may be used.

Figure 2:
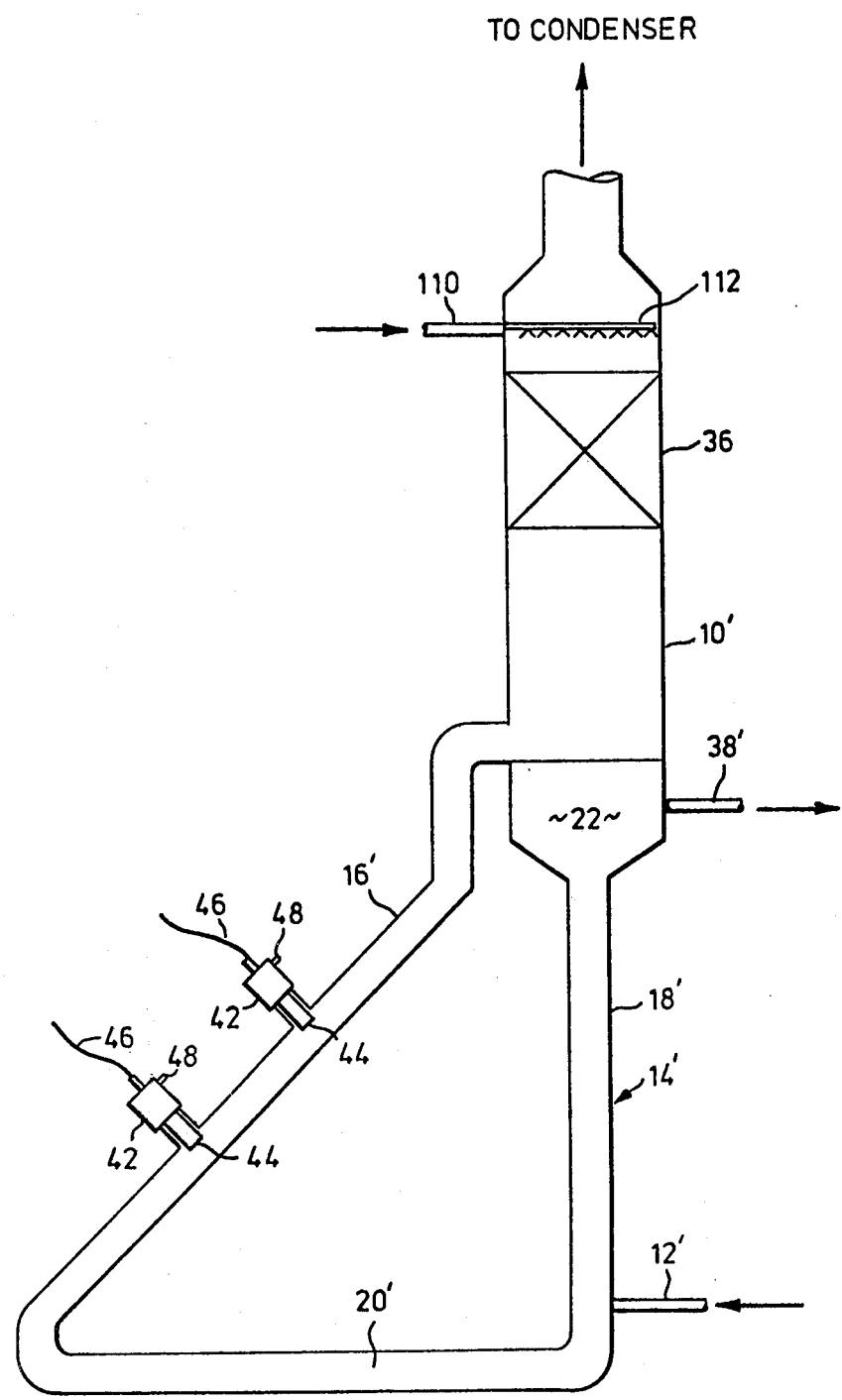
FIG. 2 is a view similar to that of FIG. 1 but showing a sulphuric acid concentration system according to the invention.

Reference is first made to FIG. 1, which as indicated shows a portion of a sulphuric acid concentration system which is in use at the present time by the assignee of the present invention. The system includes a first stage evaporator 10 which receives pre-heated feed acid via a conduit 12 from a pre-heater, not shown. The bottom of the evaporator 10 is equipped with a thermosyphon loop 14. The loop 14 has a first leg 16 for downwardly flowing acid and a second leg 18 for upwardly flowing acid, the bottoms of the legs being connected together by a conduit 20. The tops of both legs are connected to the bottom of the evaporator 10 at or just below the surface of the acid 22 therein.

Acid in the leg 18 is heated by a tantalum heater 24 containing tantalum tubes (not shown individually) and into which hot high pressure steam is injected at 26 and condensate withdrawn at 28. Convection currents cause a flow of acid downwardly through leg 16 and then upwardly through 18 past the heater 24 where heat is transferred to the acid. Water vapour evaporated from the acid leaves the evaporator 10 via a conduit 30 and is condensed in a direct contact condenser 32. A steam ejector 34 is used to extract air and thus maintain the desired vacuum on the system. A de-mister pad 36 is incorporated into the evaporator 10 to remove acid drops and mist particles.

The sulphuric acid which has been partially concentrated in evaporator 10 flows by gravity via conduit 38 to the next stage evaporator 40 which is similar to design to the evaporator 10 but which operates at a lower absolute pressure. Typically a booster ejector 41 will be required to raise the pressure in the final stage condensor to achieve satisfactory condensation.

The evaporator 10 and piping used are typically borosilicate glass (such as Pyrex, trade mark) or glass lined steel to prevent attack by the acid.

As previously indicated, the system shown in FIG. 1 suffers from a number of disadvantages, including the relatively low temperature to which operation must be limited, considerable wasted energy because of the large steam ejectors required, and high capital costs because of the high pressure heat exchange tubing needed.

Reference is next made to FIG. 2, in which primed reference numerals indicate parts corresponding to those of FIG. 1. The FIG. 2 evaporator 10' and thermosyphon loop 14' are similar to those to FIG. 1, except that the leg 16' of the thermosyphon loop which was previously oriented vertically is now oriented at an angle to the vertical (typically 45°) and two electrode structures each indicated at 42 have been inserted into the leg 16'. Each electrode structure contains an electrode 44 which contacts the acid in the leg 16' and which is connected by a cable 46 to a source of AC power, not shown. The electrodes 44 are made of material which is as inert as possible in the liquid being concentrated. It is found that graphite, essentially free of any organic binders, is most suitable for use with sulphuric acid and the electrodes 44 are therefore preferably made of such material when the liquid being concentrated is sulphuric acid. In addition, the electrodes 44 are blanketed with air, injected through hoses 48, to prevent the acid from soaking through the electrodes.

Figure 3:
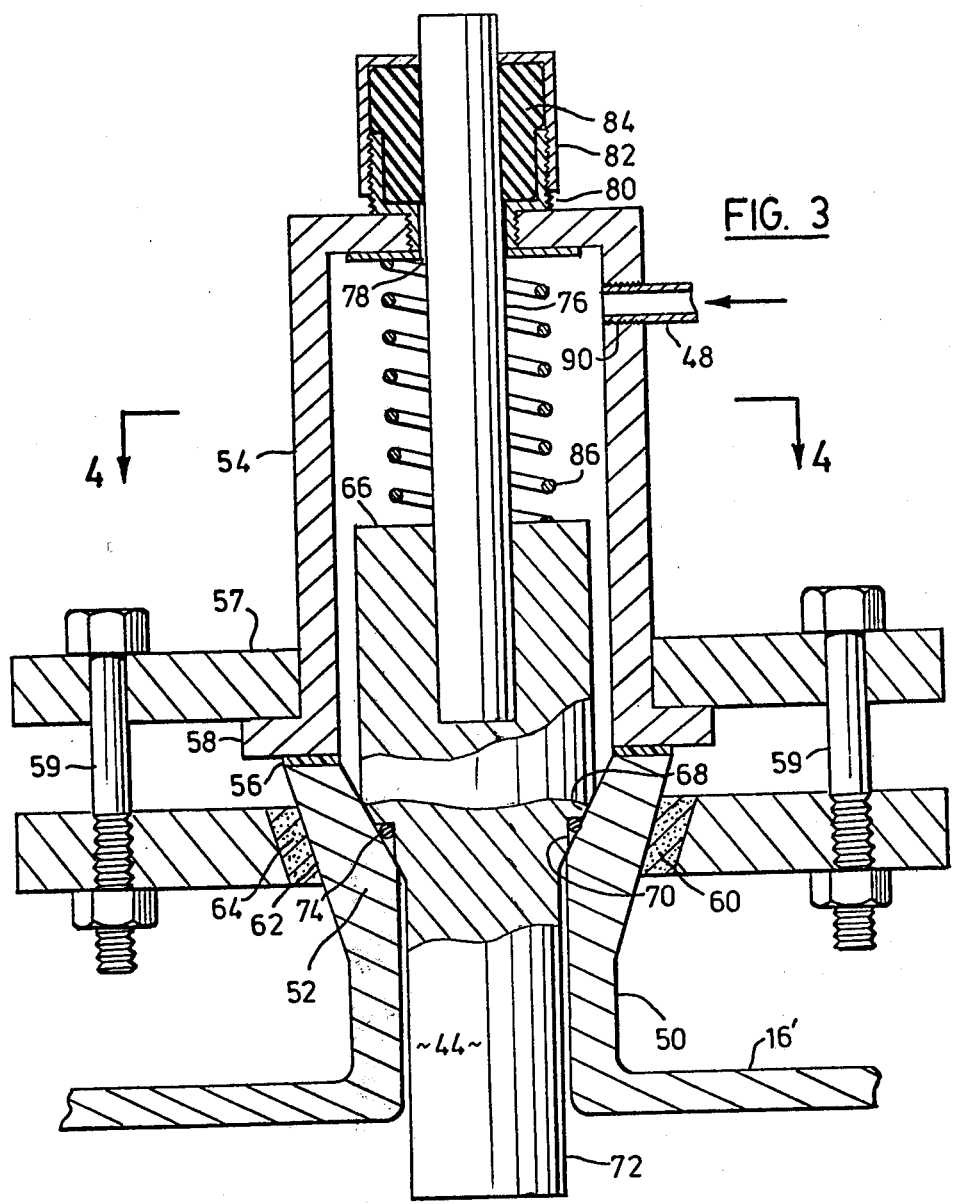
FIG. 3 is a sectional view showing in detail the electrode structure of FIG. 2.
Figure 4:
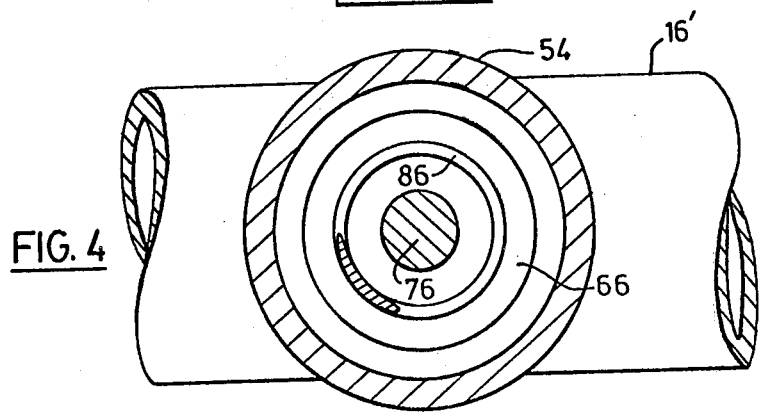
FIG. 4 is a cross-sectional view taken along lines 4—4 of FIG. 3.

A preferred form of electrode structure 42 is shown in FIG. 3. The electrode structure 42 includes a glass or glass-lined steel stub conduit 50 which is formed integral with the leg 16', extends at right angles therefrom, and has a flared end 52. A cylindrical electrode housing 54 of carbon steel is seated on the flared end of the stub conduit 50. The housing 54 is sealed to the end 52 by a flat annular sealing ring 56 and is held in position by a ring 57. The ring 57 overlies a flange on the housing 54 and is tightened by bolts 59 against a split ring 60 encircling the conduit 50. The split ring 60 has a tapered opening 62 faced with a heat resistant cushioning material such as asbestos, to bear against the flared end 52 of the stub conduit 50.

The electrode 44, which is located within the housing 54, is a graphite mass having an upper portion 66, a tapered centre portion 68 with a circumferential groove 70 located therein, and a lower acid contacting portion 72. A sealing O-ring 74 made of Teflon (trade mark) plastic, or other suitable relatively inert sealing material is located within the groove 70 to provide a seal between the electrode 44 and the flared end 52 of stub conduit 50. A copper rod 76 is threaded into the upper portion of the electrode 44 (the threads are not shown) and extends through an opening 78 in the end of housing 54. Opening 78 is sealed by a standard pressure coupling which consists of a generally U-shaped (in cross section) fitting 80 screwed into opening 78 and a cap 82 screwed onto fitting 80. Cap 82 compresses a rubber sealant 84 about the rod 76 to prevent leakage of air through the opening 78.

The entire electrode 44 is biased so that its tapered end 68 seats tightly against the flared inner surface of stub conduit 50, bias force being provided by a spring 86 encircling the copper rod 76. Air enters the electrode structure via the hose 48 which extends to a hole 90 drilled through the housing 54.

In operation, current is supplied to the electrodes 44 by a clamp (not shown) connected to rod 76. The current density is made sufficient to heat the acid between the electrodes 44 but insufficient to cause boiling of the acid at the hydrostatic pressure present at the level of the upper electrode. The cross sectional area of the leg 16', the electrical resistance of the acid at the operating temperature, and the voltage applied to the electrodes, as well as the circulating velocity of the acid in the thermosyphon loop, are coordinated to ensure that boiling of the acid occurs only above the level of the upper electrode 44, where the hydrostatic pressure is lower. Since boiling does not occur at the level of the electrodes 44, erosion of the electrodes is therefore reduced. The heating is however sufficient to ensure that boiling of the acid occurs in the upper portion of the leg 16', below its junction with the evaporator 10'.

The air injected into the electrode structures 42 serves several purposes. Firstly, the carbon electrodes 44 are normally porous and the air prevents the acid from soaking through the electrodes 44 and from leaking past the O-ring 74 and attacking the housing 54, copper rod 76 and spring 86. For this purpose the electrode structures 42 are preferably aligned at an angle inclined to the horizontal, so that the acid is less likely to be able to leak past the lower part of the O-ring 74.

Secondly, the air flow promotes circulation in the thermosyphon loop 14'. Although it is known to inject air into the bottom of one leg of a thermosyphon to promote circulation (by reducing the density of the material in the column into which air has been injected), injection of air into electrodes located in the column is so far as is known quite unique. Although additional air can if necessary be injected at a separate location near the bottom of the thermosyphon loop 14', it is preferred to inject air only at the electrode locations to simplify the system (i.e. to reduce the number of separate connections into acid—containing conduits). The air provides sufficient lift that leg 16' can be connected to evaporator 10' slightly above the level of the liquid 22 therein, although normally leg 16' is connected approximately at or just below this level.

Thirdly, the air stabilizes the flow in the thermosyphon loop. Normally in a thermosyphon loop, acid is heated directly to the boiling point by a heater placed in the loop. However with the present invention, where boiling occurs above the level of the upper electrode 44, circulation tends to occur in intermittent bursts. Without the air, acid will be heated, rise, vapour will form near the surface and create a sudden short period of rapid flow, bringing fresh cold acid into contact with the electrodes, and then after a short time the process will repeat. The injection of air into the leg containing the electrodes creates a steady circulation around the loop, stabilizing the flow and preventing the undesired sudden bursts of flow. The stabilized flow improves operation, prevents risk of damage to the apparatus, and also maintains a more even temperature throughout the system, reducing thermal stresses. Suitable gases other than air (e.g. nitrogen) may also be used if desired.

Figure 5:
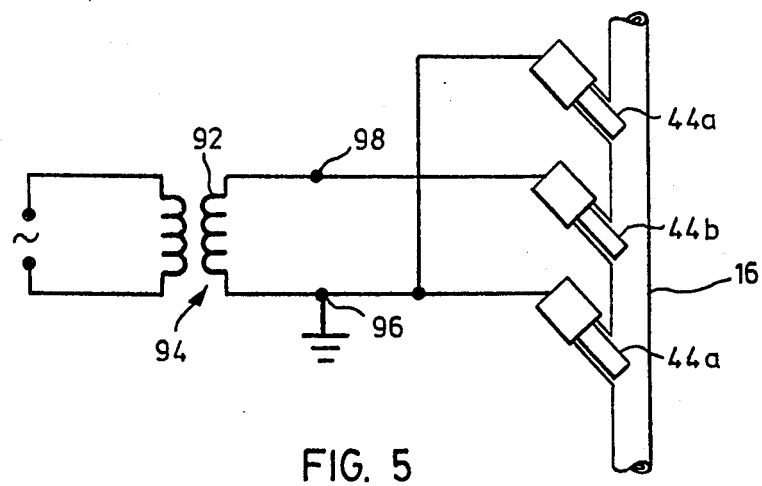
FIG. 5 is a diagrammatic view showing use of the invention with three electrodes.

A preferred form of electrode connection for a single phase power supply for the system of FIG. 2 is shown in FIG. 5. In FIG. 5 the secondary winding 92 of a power transformer 94 has one terminal 96 grounded. Terminal 96 is connected to a pair of outer electrodes 44a, and the other terminal 98 is the secondary winding 92 is connected to a center electrode 44b. The outer electrodes 44a substantially prevent current from passing beyond them and limit any current in the remainder of the leg 16' to relatively small stray currents.

Figure 6:
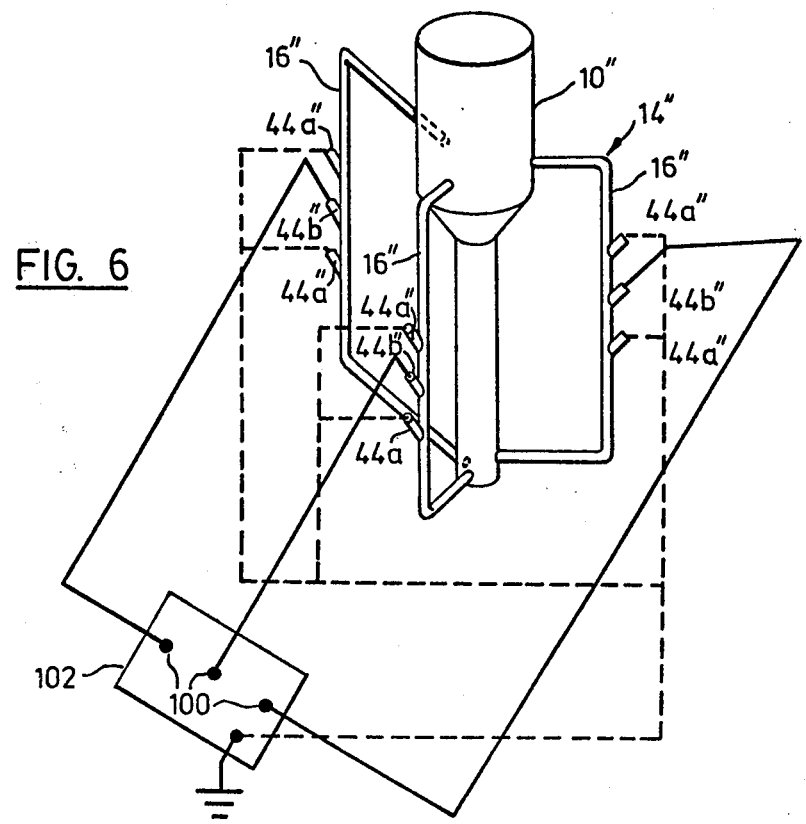
FIG. 6 is a diagrammatic view showing use of a system according to the invention with a three phase power supply.

Reference is next made to FIG. 6, which shows a three phase electrode connection corresponding to the single phase connection shown in FIG. 5. In FIG. 6, where double primed reference numerals indicate parts corresponding to those of the previous drawings, there are three legs 16" forming in effect three separate branches of the thermosyphon loop 14". Each leg 16" contains a centre electrode 44b" and two outer electrodes 44a". The outer electrodes 44a" are all grounded as shown, and the centre electrodes 44b" are each connected to the terminals 100 of a three phase power supply 102. The power supply 102 is preferably adjustable to facilitate control of the input power (to control the extent of the boiling). It is possible to operate the three phase system without the guard electrodes, but this is less desirable since the electrical path is less well defined and larger stray currents are likely to occur.

If desired, and as shown in FIG. 7, the leg 16' may be oriented vertically and the stub conduit 50 may be oriented at an angle to the leg 16' which is less than 90°, again to reduce the likelihood of liquid reaching and leaking past the lowest portion of the O-ring 74. Alternatively, and as shown in FIG. 8, the leg 16 may be oriented at an angle to the horizontal and the stub conduit 50 may be oriented vertically.

If desired, and to reduce the lateral size of the system, the piping configuration shown in FIG. 9 may be used, where the leg 16' is of double-V or serpentine configuration, with one electrode 44a or 44b in each leg of the double-V.

The air pressure used to blanket the electrodes will depend on the size of the apparatus used, the porosity of the electrodes, and on the other parameters of the system. In a typical example, the electrodes were of graphite sold by Canadian Stackpole Limited of Toronto, Ontario, Canada as carbon grade 20—20 which was stated to be 99.85% carbon and the remainder ash. In a typical example an air pressure of 30 p.s.i.g. was found adequate to protect the electrodes and their seals and to supply sufficient air to promote flow in the thermosyphon loop 14'. It will be appreciated that in all cases the pressure and flow of air must be sufficient to overcome hydrostatic pressure and produce a stable circulation despite the fact that boiling of the acid occurs only above the electrodes. The flow needed for this purpose is easily determined for a given installation by trial. If more air is needed than can be fed through the electrodes, air may be introduced elsewhere in the electrode leg of the loop, although it is preferred to introduce all the air through the electrodes. It will also be noted that since capillary action helps to draw acid through the electrodes, even in the absence of a substantial hydrostatic head, and since the air pressure needed to force air through the electrodes to prevent this varies inversely with the diameter of the electrode pores, it is preferred to have an electrode with relatively large pores rather than one with very fine pores, unless the electrode material is so dense that it is totally impervious to seepage of acid therethrough. If non-porous electrodes are used, the air required to promote and stabilize circulation will be added elsewhere in the electrode legs.

Because the apparatus of the invention can be operated at higher temperatures and pressures than the apparatus of FIG. 1, it may be desirable, as shown in FIG. 2, to add at the top of the evaporator 10' an acid spray pipe 110 and spray nozzles 112. Acid (or other liquid being concentrated) is introduced through pipe 110 and sprayed downwardly through nozzles 112 in conventional manner, to remove acid or other corrosive liquid vapours from the gases rising toward the condenser. Conventional packed scrubbers may also be used, as indicated by packed section 36 in FIG. 2.

We claim:

1. Apparatus for concentrating an aqueous, corrosive, electrically conductive acid, comprising:
   (a) an evaporator vessel adapted to contain said acid at a selected level,
   (b) a thermosyphon loop connected to said evaporator vessel, said loop having first and second legs each having a top and bottom separated by a substantial vertical distance, the top of said first leg being connected to said vessel below said level, the top of said second leg being connected to said vessel approximately at or below said level, the bottom of said first leg being connected to the bottom of said second leg, said second leg having an orientation which has a substantial vertical component,
   (c) a pair of spaced electrode structures located in said second leg and each electrode structure comprising:
      (i) a stub conduit extending from said second leg at an angle inclined to the horizontal,
      (ii) means defining with the end of said stub conduit remote from said second leg a gas-tight housing,
      (iii) an electrode of substantially inert material within said stub conduit, said electrode having a first portion extending into said second leg to contact said acid and a second portion in said housing, said electrode comprising a porous material communicating between the interior of said housing and said second leg,
      (iv) a seal encircling said electrode at a position spaced along said stub conduit from said second leg and seating against said stub conduit,
      (v) connection means within said housing connected to said second portion of said electrode and being separated by said seal from said first portion of said electrode, said connection means extending through said housing and being adapted to receive electric power from a power supply,
   (d) said electrode structures being spaced substantially below said level,
   (e) means for supplying electric power through said connection means to said electrodes at a rate such as to cause boiling of said acid entirely above said electrodes,
   (f) means connected to said second leg for supplying a gas thereto at a pressure and flow sufficient to ensure circulation of said acid in said loop when said electric power is supplied to said electrodes and to stabilize said circulation,
   (g) said means (f) being connected to each of said housings for pressurizing said housings to thereby force at least some of said gas through each electrode into said second leg whereby to protect said connection means against attack by said acid and to reduce acid attack against said seal.

2. Apparatus according to claim 1 wherein each electrode is formed of carbon, said carbon being essentially free of any organic material.

3. Apparatus according to claim 1, wherein said thermosyphon loop contains three said second legs, each containing a said electrode therein, said electrodes being adapted to be connected to the respective output phases of a three phase power supply.

4. Apparatus according to claim 1 wherein each electrode structure includes spring means in said housing for biasing said electrode and seal against said stub conduit.

* * * * *